United States Patent
Liu et al.

(10) Patent No.: US 11,089,018 B2
(45) Date of Patent: Aug. 10, 2021

(54) GLOBAL UNIQUE DEVICE IDENTIFICATION CODE DISTRIBUTION METHOD

(71) Applicant: HON HAI PRECISION INDUSTRY CO., LTD., New Taipei (TW)

(72) Inventors: Young-Way Liu, New Taipei (TW); Chi-Jsung Lee, New Taipei (TW); Liang-Te Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 315 days.

(21) Appl. No.: 16/255,853

(22) Filed: Jan. 24, 2019

(65) Prior Publication Data

US 2019/0386990 A1    Dec. 19, 2019

(30) Foreign Application Priority Data

Jun. 15, 2018 (CN) .......................... 201810623597.3

(51) Int. Cl.
*H04L 29/06* (2006.01)
*H04L 9/08* (2006.01)
(Continued)

(52) U.S. Cl.
CPC ........ *H04L 63/0876* (2013.01); *H04L 9/0637* (2013.01); *H04L 9/0866* (2013.01);
(Continued)

(58) Field of Classification Search
CPC ..... H04L 63/08; H04L 63/0876; H04L 63/06; H04L 63/04; H04L 63/0428; H04L 63/0442; H04L 63/0435; H04L 63/045; H04L 63/12; H04L 9/08; H04L 9/0866; H04L 9/0869; H04L 9/06; H04L 9/0637; H04L 9/0662; H04L 9/0825; H04L 9/32; H04L 9/3226; H04L 67/12; H04L 2209/38; H04L 2209/805
See application file for complete search history.

(56) References Cited

U.S. PATENT DOCUMENTS

| | | | |
|---|---|---|---|
| 7,809,843 B1 * | 10/2010 | Denninghoff | H04L 67/146 709/228 |
| 10,356,092 B2 * | 7/2019 | Mattela | H04W 12/69 |

(Continued)

FOREIGN PATENT DOCUMENTS

CN          106603586          4/2017

*Primary Examiner* — Kristine L Kincaid
*Assistant Examiner* — Shaqueal D Wade
(74) *Attorney, Agent, or Firm* — ScienBiziP, P.C.

(57) ABSTRACT

A global unique device identification code distribution method includes obtaining a public key and device information of at least one Internet of things (IoT) device after the blockchain node establishes communication with the at least one IoT device, generating a random code and combining the random code with the public key and device information of the at least one IoT device to generate a global unique device identification code, and sending the global unique device identification code to the IoT device and writing the global unique device identification code and the public key of the IoT device as a pair into the blockchain network. The method is implemented in a blockchain node of a blockchain network.

11 Claims, 9 Drawing Sheets

(51) Int. Cl.
*H04L 9/06* (2006.01)
*H04L 29/08* (2006.01)

(52) U.S. Cl.
CPC ........ *H04L 9/0869* (2013.01); *H04L 63/0428* (2013.01); *H04L 63/0442* (2013.01); *H04L 63/12* (2013.01); *H04L 67/12* (2013.01); *H04L 2209/38* (2013.01)

(56) References Cited

U.S. PATENT DOCUMENTS

| | | | |
|---|---|---|---|
| 2011/0225064 A1* | 9/2011 | Fou | G06Q 20/385 |
| | | | 705/26.41 |
| 2013/0339314 A1* | 12/2013 | Carpentier | G06F 3/0608 |
| | | | 707/692 |
| 2017/0302663 A1 | 10/2017 | Nainar et al. | |
| 2018/0183587 A1* | 6/2018 | Won | H04L 9/0891 |
| 2018/0254898 A1* | 9/2018 | Sprague | H04L 9/3271 |
| 2019/0097989 A1* | 3/2019 | Rawcliffe | H04L 63/08 |
| 2019/0362076 A1* | 11/2019 | Wang | G06Q 30/0207 |

\* cited by examiner

GLOBAL UNIQUE DEVICE IDENTIFICATION CODE DISTRIBUTION METHOD

FIELD

The subject matter herein generally relates to Internet of things (IoT) devices, and more particularly to a method of assigning a global unique device identification code to IoT devices in a blockchain network.

BACKGROUND

Generally, Internet of things (IoT) device manufactures provide identity verification processes for the IoT devices. However, different manufacturers do not use the same processes for verifying the identity of the IoT devices, and the identity of an IoT device may be stolen or mistaken.

BRIEF DESCRIPTION OF THE DRAWINGS

Implementations of the present disclosure will now be described, by way of example only, with reference to the attached figures.

DETAILED DESCRIPTION

Figure 1:
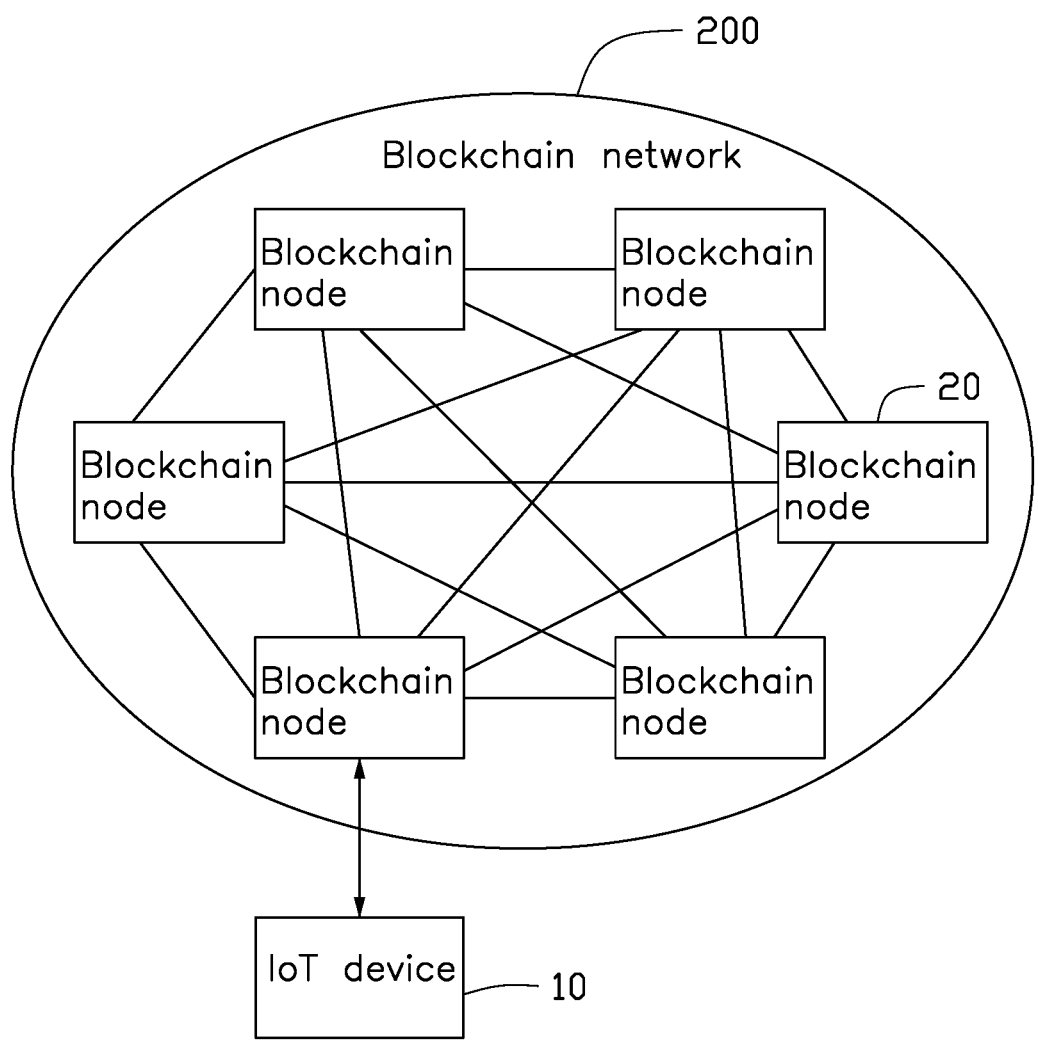
FIG. 1 is a diagram of a blockchain network in communication with an Internet of things (IoT) device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of an Internet of things device 10 (hereinafter "the IoT device 10") in communication with a blockchain node 20 of a blockchain network for sending a public key and device information of the IoT device 10 to the blockchain node 20. The blockchain network 200 includes a plurality of blockchain nodes 20, and the IoT device 10 may establish communication with any one of the blockchain nodes 20. In one embodiment, each blockchain node 20 is a global unique device identification code distribution device. The blockchain node 20 generates a random code and combines the random code with the public key and the device information to generate a global unique device identification code. The blockchain node 20 sends the global unique device identification code to the IoT device 10 and writes the global unique device identification code into the blockchain network 200.

Figure 2:
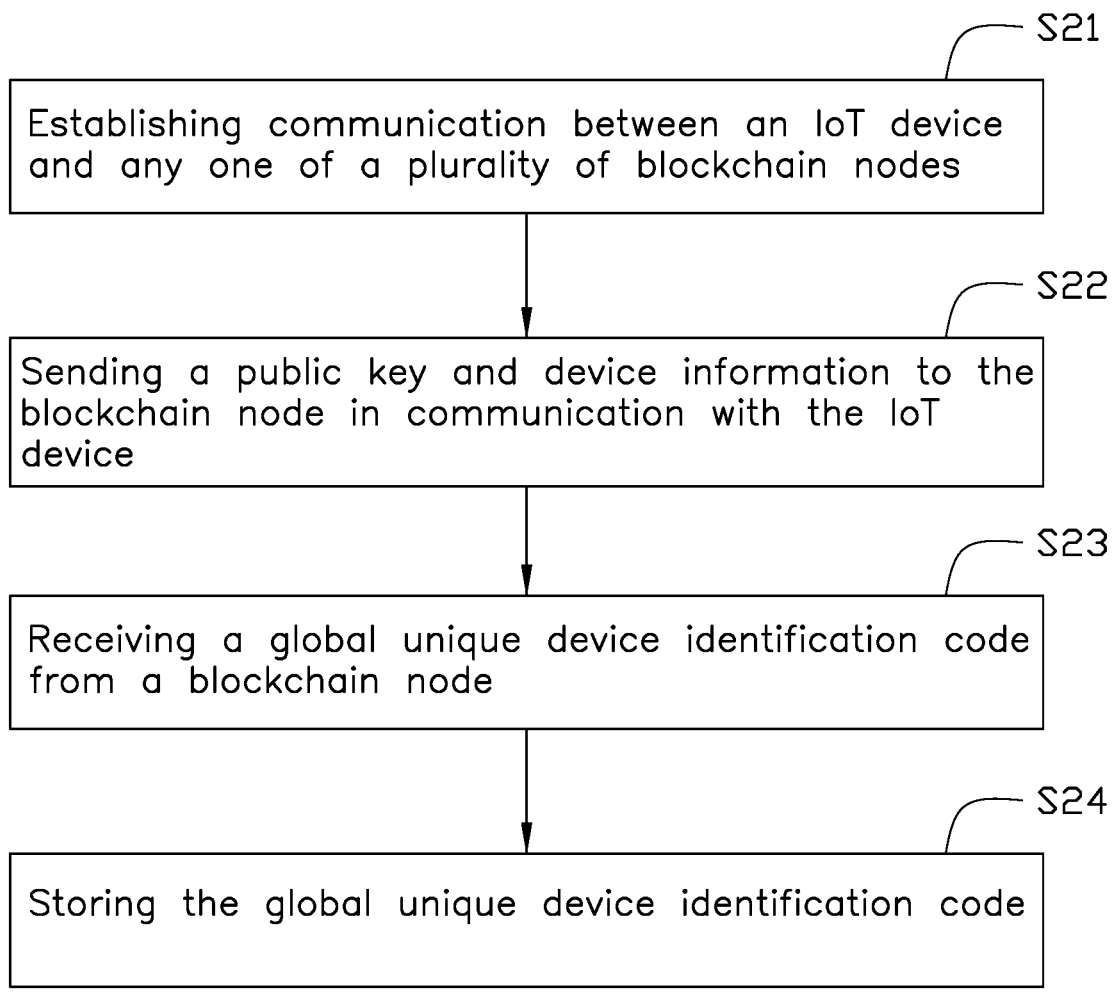
FIG. 2 is a flowchart of a method implemented in the IoT device for obtaining a global unique device identification code.

FIG. 2 illustrates a flowchart of a method implemented in the IoT device 10 for obtaining the global unique device identification code. The method is provided by way of embodiment, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S21, communication is established with any one of the blockchain nodes 20.

In one embodiment, before communication is established with the blockchain node 20, the IoT device 10 first detects a network connection status, and establishes communication with the blockchain node 20 when the network status is normal. When the network status is not normal, the network connection is repaired to establish communication with the blockchain node 20.

At block S22, the public key and device information is sent to the blockchain node 20 in communication with the IoT device 10. The blockchain node 20 generates the global unique device identification code according to the public key and device information of the IoT device 10.

In one embodiment, before block S22, the IoT device 10 first determines whether the public key and a private key is stored in the IoT device 10. When the public key and private key are stored in the IoT device 10, block S22 is implemented. When there is no public key and private key stored in the IoT device 10, the IoT device 10 generates the public key and private key.

In one embodiment, the public key and private key are generated by a public key cryptography algorithm.

In one embodiment, the device information of the IoT device 10 may be, but is not limited to, a serial number or a Mac Address of the IoT device.

At block S23, the global unique device identification code is received from the blockchain node 20.

At block S24, the global unique device identification code is stored.

In one embodiment, the global unique identification code is stored in a secure storage area of the IoT device 10. The secure storage area is not accessible by an external device and is not able to be damaged by a power shortage or other reason.

In one embodiment, the method for obtaining the global unique device identification code is only implemented when the IoT device 10 is startup for a first time.

When the IoT device 10 obtains and stores the global unique device identification code, the method for obtaining the global unique device identification code is not implemented again.

Thus, a manufacturer of the IoT device 10 can obtain the global unique device identification code from the blockchain node 200. Therefore, the manufacturer does not need to imprint a serial number or device code on the IoT device 10, thereby saving a cost of manufacture and enhancing production efficiency. The global unique device identification code cannot be duplicated and is stored in the secure storage area of the IoT device 10.

Figure 3:
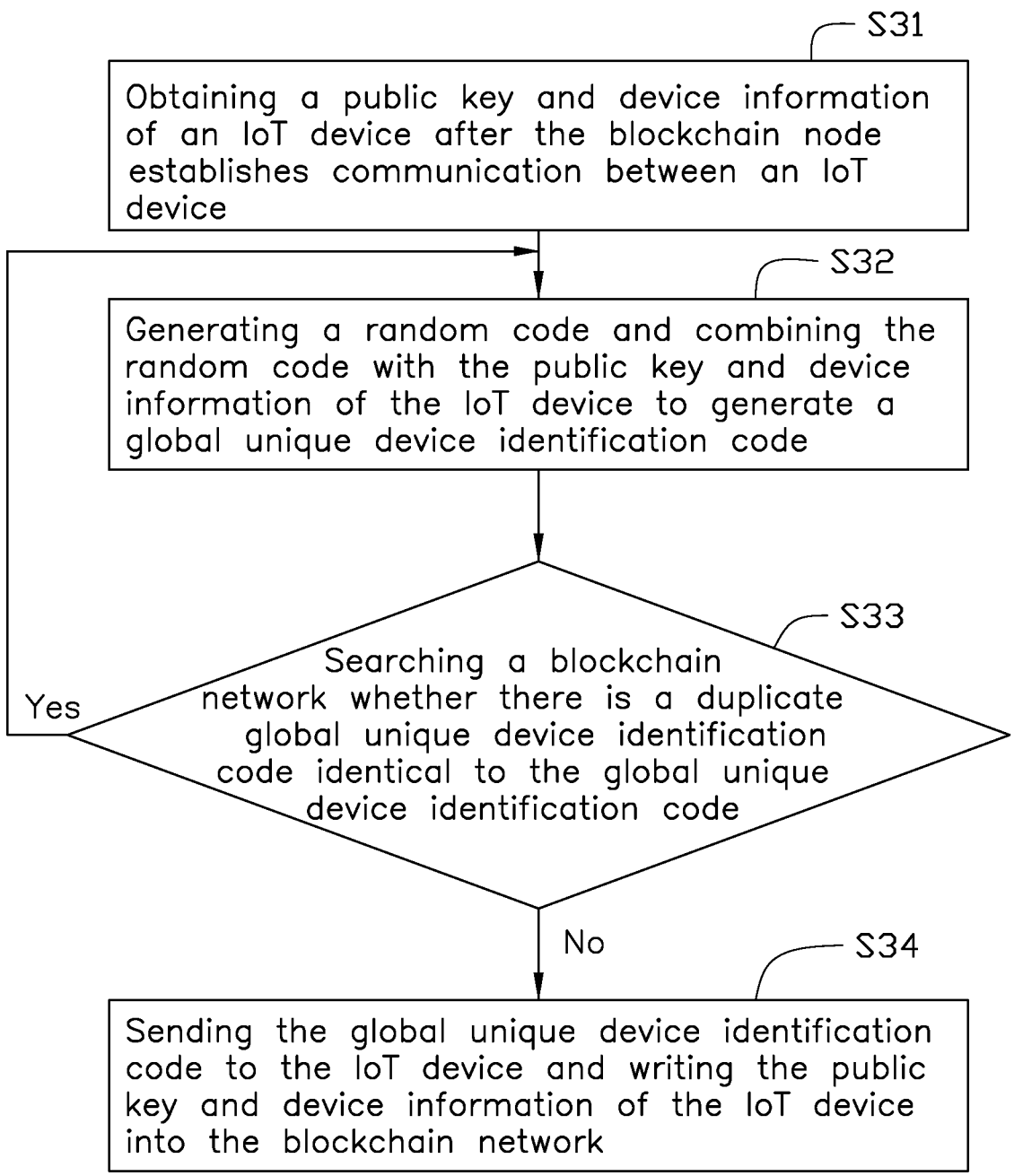
FIG. 3 is a flowchart of a global unique device identification code distribution method implemented in any one of a plurality of blockchain nodes of the blockchain network.

FIG. 3 illustrates a flowchart of a global unique device identification code distribution method implemented in any one of the blockchain nodes 20 of the blockchain network 200. The method is provided by way of embodiment, as there are a variety of ways to carry out the method. The method described below can be carried out using the configurations illustrated in FIGS. 1 and 2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S31, a public key and device information of the IoT device 10 is obtained after the blockchain node 20 establishes communication with the IoT device 10.

At block S32, a random code is generated and combined with the public key and device information of the IoT device 10 to generate a global unique device identification code.

At block S33, the blockchain network 200 is searched whether there is a duplicate global unique device identification code identical to the global unique device identification code. When there is a duplicate global unique device identification code found in the blockchain network 200, block S32 is repeated and the random code is regenerated and combined with the public key and device information to regenerate the global unique device identification code. When there is no duplicate global unique device identification code found in the blockchain network 200, block S34 is implemented.

At block S34, the global unique device identification code is sent to the IoT device 10, and the public key and device information of the IoT device 10 are written into the blockchain network 200.

In one embodiment, before the global unique device identification code is sent to the IoT device 10, the global unique device identification code is encrypted according to a predetermined encryption and decryption algorithm. The encrypted global unique device identification code is sent to the IoT device 10.

The IoT device 10 decrypts the encrypted global unique device identification code and stores the decrypted global unique device identification code.

Figure 4:
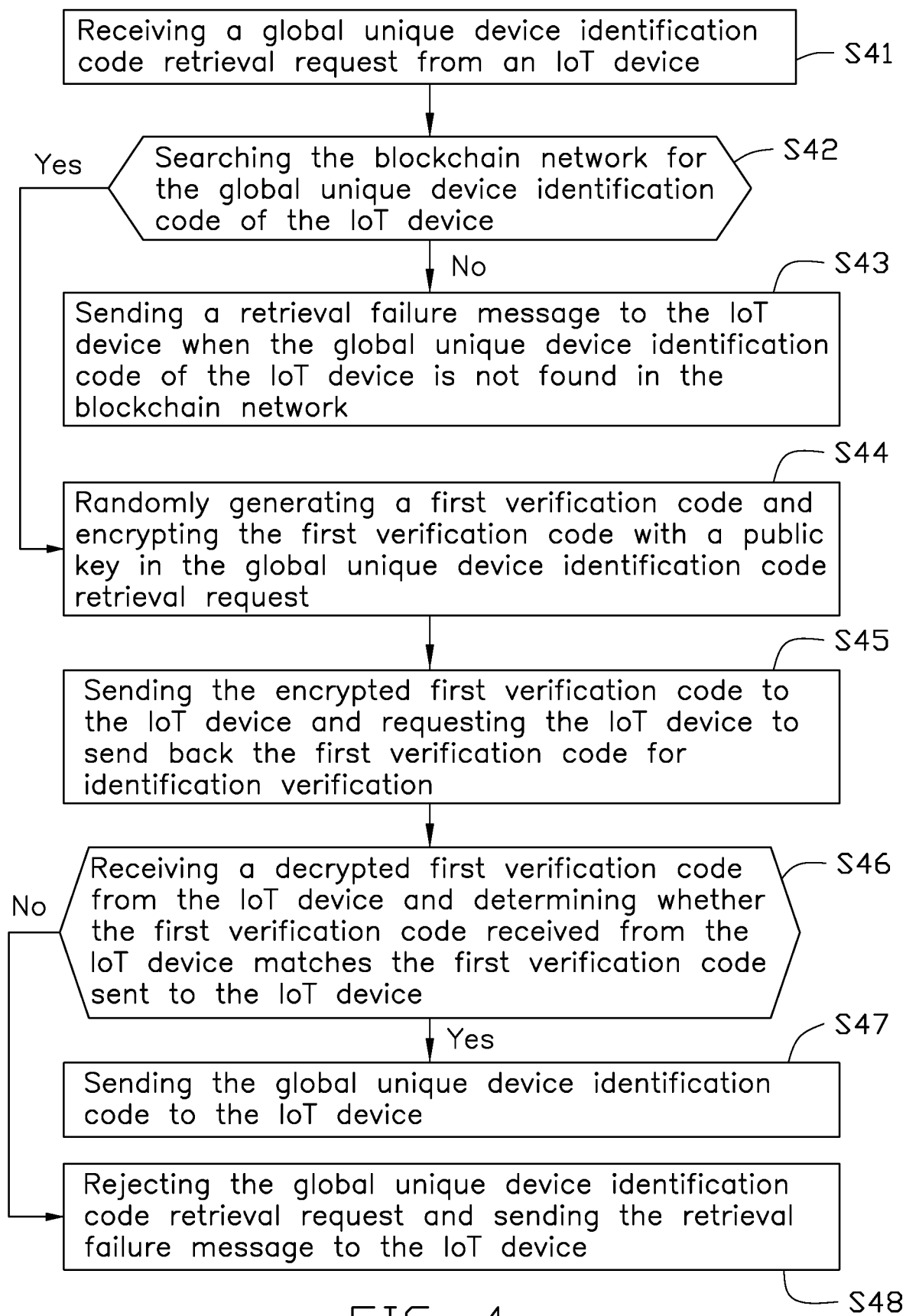
FIG. 4 is a flowchart of a global unique device identification code retrieval method implemented in any one of the blockchain nodes of the blockchain network for retrieving the global unique device identification code of the IoT device.

FIG. 4 illustrates a flowchart of a global unique device identification code retrieval method implemented in any one of the blockchain nodes 20 of the blockchain network 200 for retrieving the global unique device identification code of the IoT device 10. The method is provided by way of embodiment, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S41, a global unique device identification code retrieval request is received from the IoT device 10. The global unique device identification code retrieval request comprises the public key of the IoT device 10.

At block S42, the blockchain network 200 is searched for the global unique device identification code of the IoT device 10. When the global unique device identification code of the IoT device 10 is not found, block S43 is implemented. When the global unique device identification code of the IoT device 10 is found, block S44 is implemented.

In one embodiment, the global unique device identification code of the IoT device 10 is found in the blockchain network 200 by searching for the public key of the global unique device identification code retrieval request. Because the public key of the IoT device 10 is combined with the global unique device identification code of the IoT device 10, when the public key is found, the global unique device identification code of the IoT device 10 is found.

In another embodiment, the global unique device identification code retrieval request includes the device information, such as a serial number, of the IoT device 10. The device information is searched in the blockchain network 200. Thus, when the device information of the IoT device 10 is found in the blockchain network 200, the global unique device identification code of the IoT device 10 is found.

At block S43, a retrieval failure message is sent to the IoT device 10 when the global unique device identification code of the IoT device 10 is not found in the blockchain network 200. The retrieval failure message indicates that the global unique device identification code of the IoT device 10 does not exist in the blockchain network 200.

When the IoT device 10 receives the retrieval failure message, the IoT device 10 can erase the public key and the private key and regenerate the public key and private key. The IoT device 10 can implement blocks S21-S24 with the new public key and private key for obtaining the global unique device identification code from the blockchain node 20.

At block S44, a first verification code is randomly generated and encrypted with the public key in the global unique device identification code retrieval request.

In one embodiment, the first verification code is a randomly generated ten-digit code, such as 2938377646.

In another embodiment, the first verification code is a randomly generated alphanumeric and symbol code with capital and lowercase letters, such as 7$tB3%f94@8.

At block S45, the encrypted first verification code is sent to the IoT device 10 and the IoT device 10 is requested to send back the first verification code for identification verification.

The IoT device 10 uses the private key to decrypt the encrypted first verification code, and then sends the decrypted first verification code to the blockchain node 20.

At block S46, the decrypted first verification code is received from the IoT device 10 and whether the first verification code received from the IoT device 10 matches the first verification code sent to the IoT device 10 is determined. When the first verification code received from the IoT device 10 matches the first verification code sent to the IoT device 10, block S47 is implemented. When the first verification code received from the IoT device 10 does not match the first verification code sent to the IoT device 10, block S48 is implemented.

In one embodiment, block S46 further includes determining whether the IoT device 10 sends back the first verification code within a predetermined time duration. When the IoT device 10 does not return the first verification code within the predetermined time duration, the retrieval failure message is sent to the IoT device 10. When the IoT device 10 returns the first verification code within the predetermined time duration, block S47 is implemented.

At block S47, the global unique device identification code is sent to the IoT device 10.

At block S48, the global unique device identification code retrieval request is rejected and the retrieval failure message is sent to the IoT device 10.

In one embodiment, the retrieval failure message may be a text message including further instructions for retrieving the global unique device identification code.

In other embodiments, the retrieval failure message may be in the form of special code, such as predetermined numbers, symbols, or letters preset in the blockchain node 20 and the IoT device 10.

For example, the IoT device 10 and the blockchain node 20 store a relationship between a plurality of abnormal codes and corresponding abnormal situations. For example, the abnormal situations may include an abnormal network connection, not finding the global unique device identification code of the IoT device 10, not verifying an identity, or the like. The abnormal codes may be serial numbers, such as 001, 002, and the like corresponding to the abnormal situations.

In one embodiment, after the blockchain node 20 sends the global unique device identification code to the IoT device 10, the identity of the IoT device 10 is further verified.

Figure 5:
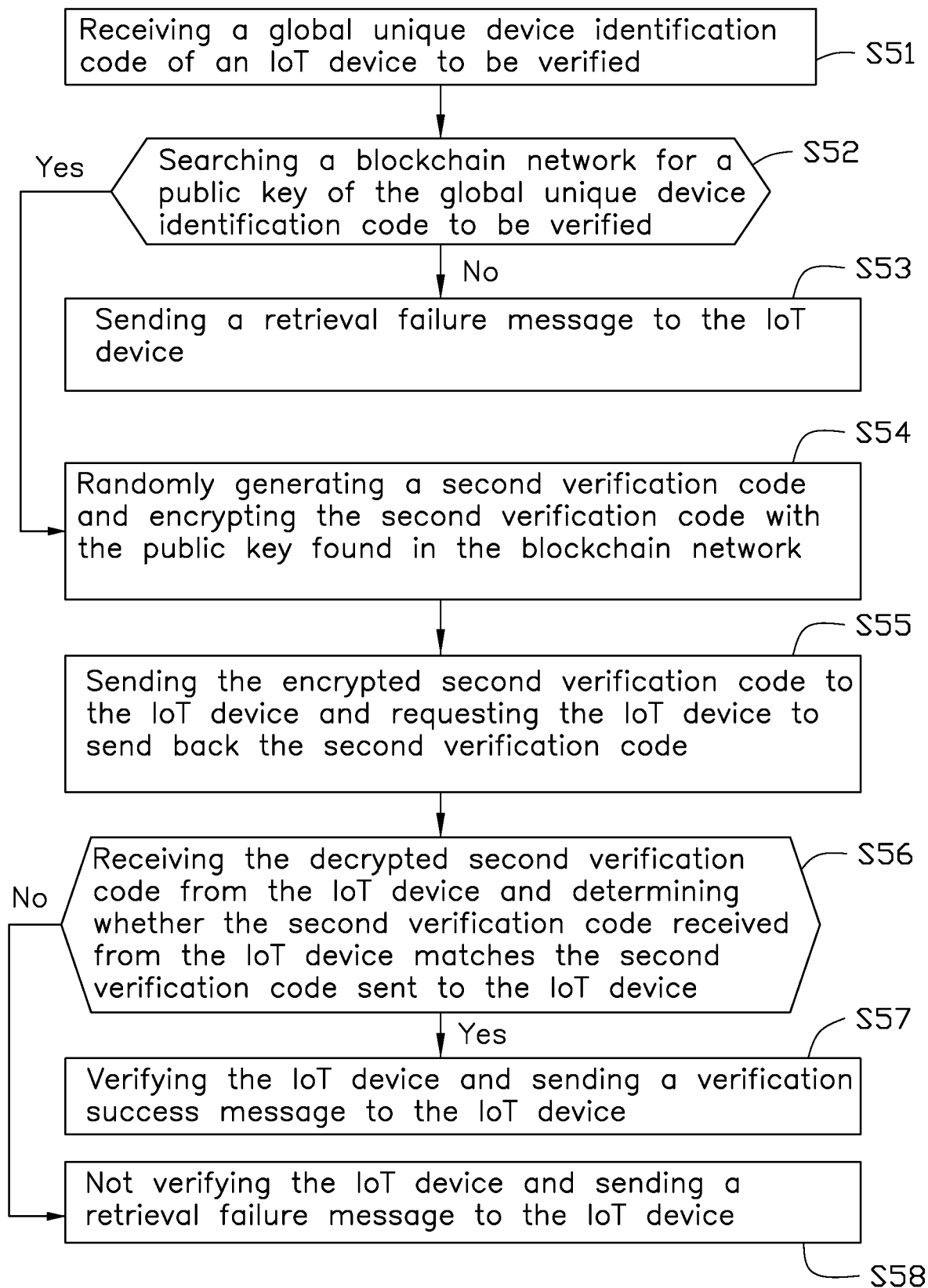
FIG. 5 is a flowchart of a method implemented in any one of the blockchain nodes of the blockchain network for verifying a global unique device identification code.

FIG. 5 illustrates a flowchart of a method implemented in any one of the blockchain nodes 20 of the blockchain network 200 for verifying a global unique device identification code. The method is provided by way of embodiment, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S51, a global unique device identification code of the IoT device 10 to be verified is received.

At block S52, the blockchain network 200 is searched for the public key of the global unique device identification code to be verified. When the public key is not found, block S53 is implemented. When the public key is found, block S54 is implemented. Because the blockchain node 20 stores the global unique device identification code and the public key of the IoT device 10 together, when the global unique device identification code is found, the public key is found.

At block S53, a retrieval failure message is sent to the IoT device 10.

At block S54, a second verification code is randomly generated and encrypted with the public key found in the blockchain network 200.

In one embodiment, the second verification code is a randomly generated ten-digit code, such as 2938377646.

In another embodiment, the second verification code is a randomly generated alphanumeric and symbol code with capital and lowercase letters, such as 7$tB3%f94@8.

At block S55, the encrypted second verification code is sent to the IoT device 10, and the IoT device 10 is requested to send back the second verification code.

The IoT device 10 uses the private key stored in the IoT device 10 to decrypt the encrypted second verification code. Then, the IoT device 10 sends back the decrypted second verification code to the blockchain node 20.

At block S56, the decrypted second verification code is received from the IoT device 10, and whether the second verification code received from the IoT device 10 matches the second verification code sent to the IoT device 10 is determined. When the second verification code received from the IoT device 10 matches the second verification code sent to the IoT device 10, block S57 is implemented. When the second verification code received from the IoT device 10 does not match the second verification code sent to the IoT device 10, block S58 is implemented.

At block S57, the IoT device 10 is verified, and a verification success message is sent to the IoT device 10.

At block S58, the IoT device 10 is not verified, and the retrieval failure message is sent to the IoT device 10.

As described in the methods above, an identity of the IoT device 10 is verified to enhance security of the IoT device 10.

Figure 6:
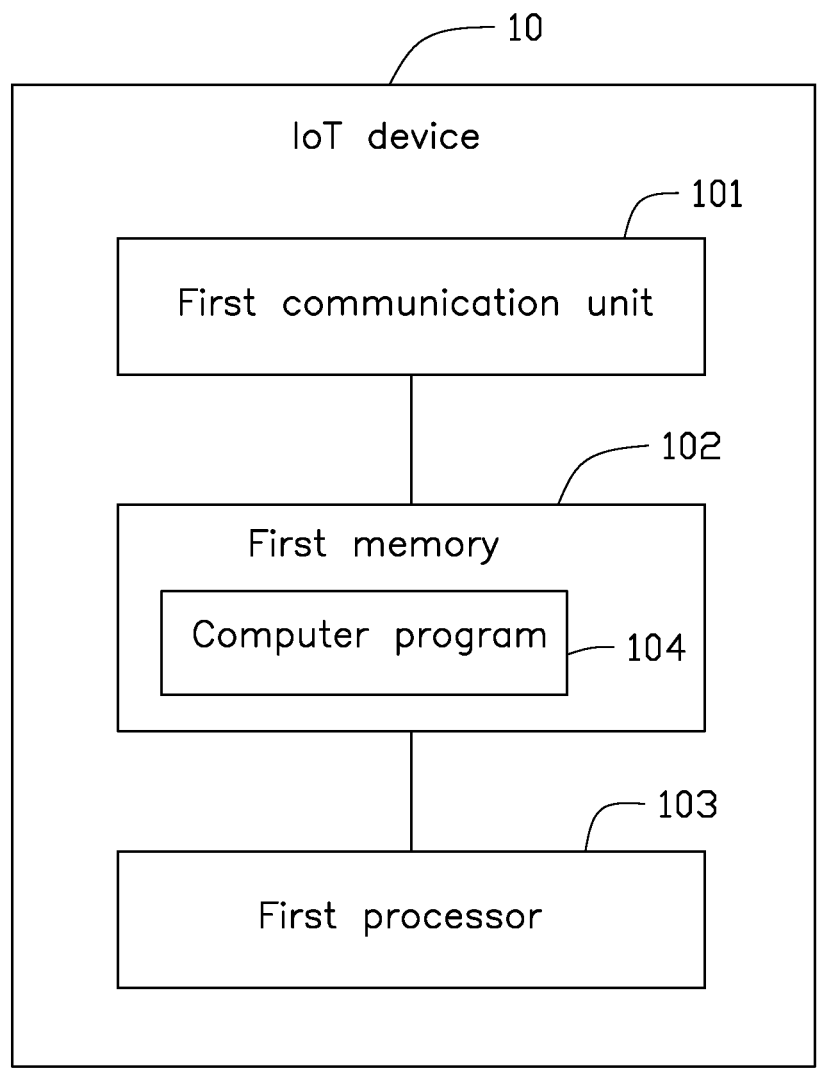
FIG. 6 is a block diagram of the IoT device.

FIG. 6 shows an embodiment of an IoT device 10. The IoT device 10 includes at least a first communication unit 101, a first memory 102, a first processor 103, and a computer program 104. The computer program 104 is stored in the first memory 102 and executed by the first processor 103.

The first communication unit 101 establishes communication with any one of the blockchain nodes 20. In one embodiment, the first communication unit 101 establishes communication through a wired or wireless means. The wired means may be through the Internet or local area network. The wireless means may be a WIFI network, honeycomb network, satellite network, broadcasting network, or the like.

The first memory 102 stores a plurality of instructions of the computer program 104. The plurality of instructions of the computer program 104 are executed by the first processor 103 for implementing functions of the computer program 104. The first memory 102 may be a read-only memory, random access memory, or an external storage device such as a magnetic disk, a hard disk, a smart media card, a secure digital card, a flash card, or the like.

The first processor 103 may be a central processing unit or other processing chip, digital signal processor, application specific integrated circuit, field-programmable gate array, or the like.

Figure 7:
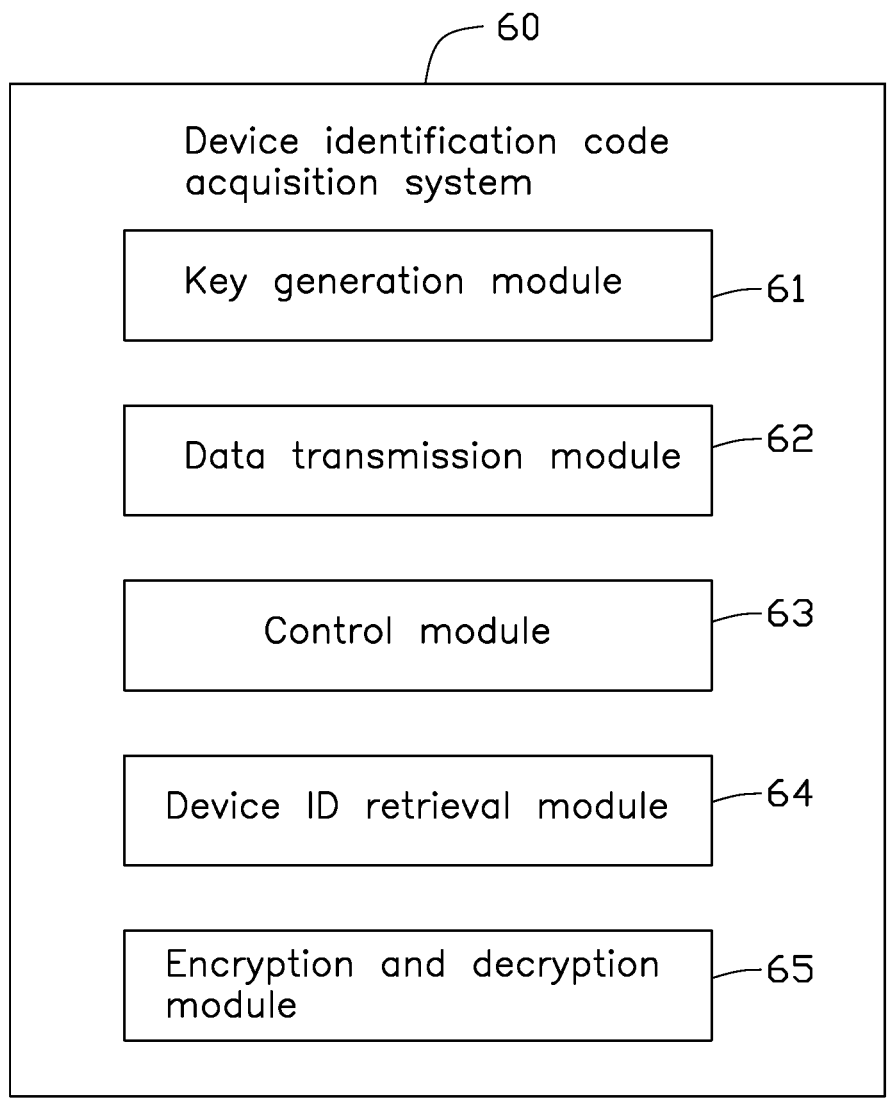
FIG. 7 is a block diagram of function modules of a device identification code acquisition system of the IoT device.

As shown in FIG. 7, the computer program 104 includes a device identification code acquisition system 60 (hereinafter "the system 60"). The system 60 includes a plurality of module, such as a key generation module 61, a data transmission module 62, a control module 63, a device ID retrieval module 64, and an encryption and decryption module 65.

The key generation module 61 generates the public key and private key. In one embodiment, the public key and private key are generated by a public key cryptography algorithm.

The data transmission module 62 sends the public key of the IoT device 10 to the blockchain node 20 when the IoT device 10 establishes communication with the blockchain node 20.

The data transmission module 62 receives the global unique device identification code from the blockchain node 20.

The control module 63 stores the global unique device identification code in a secure storage area of the first memory 102. The secure storage area is not accessible by an outside device and is not damageable.

The device ID retrieval module 64 generates the global unique device identification retrieval request in response to a user operation and sends the global unique device identification retrieval request to the blockchain node 20. The global unique device identification retrieval request includes the public key of the IoT device 10.

The device ID retrieval module 64 receives the encrypted first verification code from the blockchain node 20.

The encryption and decryption module 65 uses the private key to decrypt the encrypted first verification code to obtain the first verification message.

The device ID retrieval module 64 sends back the first verification code to the blockchain node 20 and receives the global unique device identification code from the blockchain node 20.

Figure 8:
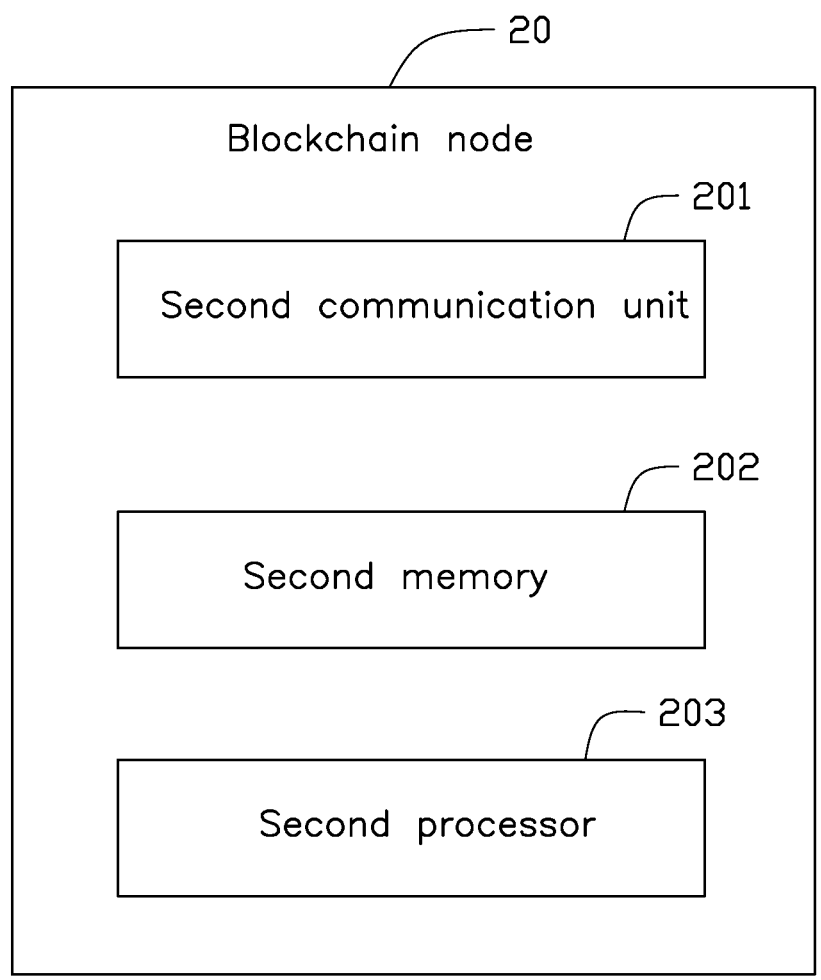
FIG. 8 is a block diagram of the blockchain node.

FIG. 8 shows an embodiment of the blockchain node 20. The blockchain node 20 includes at least a second communication unit 201, a second memory 202, and a second processor 203.

The second communication unit 201 establishes communication with at least one IoT device 10 and the other blockchain nodes 20 of the blockchain network 200.

The second memory 202 stores a plurality of data and programs of the blockchain node 20, such as an account book of the blockchain node 20, registration information of the IoT device 10, and the global unique device identification code and public key. The second memory 202 may be a read-only memory, random access memory, or an external storage device such as a magnetic disk, a hard disk, a smart media card, a secure digital card, a flash card, or the like.

The second processor 203 may be a central processing unit or other processing chip, digital signal processor, application specific integrated circuit, field-programmable gate array, or the like.

Figure 9:
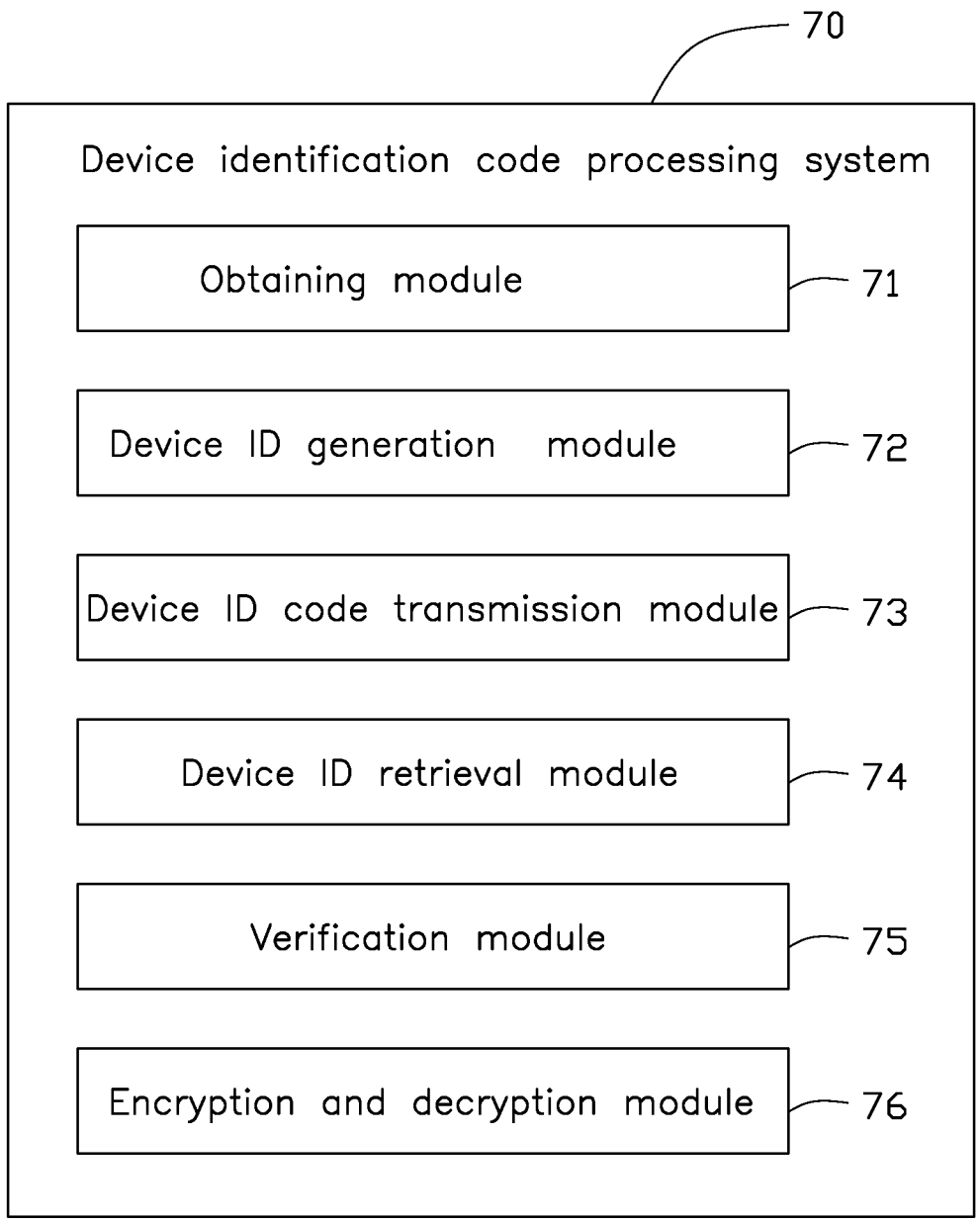
FIG. 9 is a block diagram of a device identification code processing system of the blockchain node.

As shown in FIG. 9, the blockchain node 20 implements a device identification code processing system 70 (hereinafter "the system 70"). The system 70 includes a plurality of instructions stored in the second memory 202 and executed by the second processor 203. The system 70 may includes an obtaining module 71, a device ID generation module 72, a device ID retrieval module 74, a verification module 75, and an encryption and decryption module 76.

The obtaining module 71 obtains the public key and device information of the IoT device 10 after the blockchain node 20 establishes communication with the IoT device 10.

The device ID generation module 72 generates the random code and combines the random code with the public key and device information to generate the global unique device identification code.

The device ID generation module 72 writes the public key and the global unique device identification code into the blockchain network 200.

In one embodiment, the device ID generation module 72 searches the account book of the blockchain network 200 for whether there is a duplicate global unique device identification code that is identical to the global unique device identification code of the IoT device 10. When there is a duplicate global unique device identification code that is identical to the global unique device identification code of the IoT device 10, the random code is regenerated, and the global unique device identification code is regenerated with the regenerated random code.

The device ID code transmission module 73 sends the global unique device identification code to the IoT device 10.

The device ID retrieval module 74 receives the global unique device identification code retrieval request from the IoT device 10. The global unique device identification code retrieval request includes the public key of the IoT device 10.

The device ID retrieval module 74 searches the blockchain network 200 for the global unique device identification code of the IoT device 10. When the global unique device identification code is not found, the retrieval failure message is sent to the IoT device 10. When the global unique device identification code is found, the device ID retrieval module 74 generates the first verification code and encrypts the first verification code with the public key and sends the encrypted first verification code to the IoT device 10.

The device ID retrieval module 74 receives the first verification code sent back from the IoT device 10 and determines whether the first verification code received from the IoT device 10 matches the first verification code sent to the IoT device 10, and sends the retrieval failure message when the first verification code received from the IoT device 10 does not match the first verification code sent to the IoT device 10.

The verification module 75 receives the global unique device identification code to be verified from the IoT device 10 and searches the blockchain network 200 for the public key of the global unique device identification code to be verified. When the public key of the global unique device identification code to be verified is not found, the retrieval failure message is sent to the IoT device 10. When the public key is found, the verification module 75 generates a random second verification code and encrypts the second verification code with the public key and sends the encrypted second verification code to the IoT device 10.

The verification module 75 receives the second verification code sent back from the IoT device 10 and determines whether the second verification code received from the IoT device 10 matches the second verification code sent to the IoT device 10, and sends the retrieval failure message when the second verification code received from the IoT device 10 does not match the first verification code sent to the IoT device 10. When the second verification code received from the IoT device 10 matches the second verification code sent to the IoT device 10, the verification success message is sent to the IoT device 10, and the IoT device 10 is verified.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A global unique device identification code distribution method implemented in a blockchain node of a blockchain network, at least one Internet of things (IoT) device establishing communication with the blockchain node, the method comprising:
   obtaining a public key and device information of the at least one IoT device after the blockchain node establishes communication with the at least one IoT device;
   generating a random code and combining the random code with the public key and device information of the at least one IoT device to generate a global unique device identification code;
   sending the global unique device identification code to the IoT device and writing the global unique device identification code and the public key of the IoT device as a pair into the blockchain network,.
   searching the blockchain network whether there is a duplicate global unique device identification code identical to the global unique device identification code;
   regenerating the random code, when there is a duplicate global unique device identification code in the blockchain network, and combining the regenerated random code with the public key and device information of the at least one IoT device to regenerate the global unique device identification code; and
   sending the global unique device identification code to the IoT device when there is not a duplicate identification code in the blockchain network.

2. The global unique device identification code distribution method of claim 1 further comprising:
   receiving a global unique device identification code retrieval request from the IoT device, the global unique device identification code retrieval request comprising the public key of the IoT device;
   searching the blockchain network for the global unique device identification code of the IoT device;
   sending a retrieval failure message to the IoT device when the IoT device does not have a corresponding global unique device identification code in the blockchain network;
   generating a first verification code when the global unique device identification code of the IoT device is found in the blockchain network and encrypting the first verification code with the public key of the IoT device;
   sending the encrypted first verification code to the IoT device and requesting the IoT device to send back the first verification code for identity verification;
   receiving the first verification code from the IoT device and determining whether the first verification code received from the IoT device matches the first verification code sent to the IoT device; and
   sending the global unique device identification code to the IoT device when the first verification code received from the IoT device matches the first verification code sent to the IoT device;
   sending the retrieval failure message to the IoT device when the first verification code received from the IoT device does not match the first verification code sent to the IoT device.

3. The global unique device identification code distribution method of claim 2 further comprising:
   receiving from the IoT device a global unique device identification code to be verified and searching the blockchain network for the global unique device identification code to be verified;
   sending a verification failure message to the IoT device when the global unique device identification code to be verified is not found in the blockchain network;
   generating a random second verification code when the global unique device identification code to be verified is found in the blockchain network and encrypting the second verification code with the public key of the IoT device found in the blockchain network;
   sending the encrypted second verification code to the IoT device and requesting the IoT device to send back the second verification code for identity verification;
   receiving the second verification code from the IoT device and determining whether the second verification code received from the IoT device matches the second verification code sent to the IoT device;
   verifying the identity of the IoT device when the second verification code received from the IoT device matches the second verification code sent to the IoT device and sending an identity verification success message; and
   determining that the IoT device is not verified when the second verification code received from the IoT device does not match the second verification code sent to the IoT device and sending an identity verification failure message.

4. The global unique device identification code distribution method of claim 1, wherein:
   the global unique device identification code is encrypted according to a predetermined encryption and decryption algorithm; and
   the encrypted device identification code is sent to the IoT device.

5. A global unique device identification code distribution device implemented as a blockchain node of a blockchain network and establishing communication with at least one Internet of things (IoT) device, the global unique device identification code distribution device comprising:
   a first communication unit establishing communication with other blockchain nodes of the blockchain network and the at least one IoT device;
   a first processor;
   a first memory storing a plurality of instructions, which when executed by the first processor, cause the first processor to:

obtain a public key and device information of the at least one IoT device after the blockchain node establishes communication with the at least one IoT device;
generate a random code and combine the random code with the public key and device information of the at least one IoT device to generate a global unique device identification code;
send the global unique device identification code to the IoT device and write the global unique device identification code and the public key of the IoT device as a pair into the blockchain network;
search the blockchain network whether there is a duplicate device identification code identical to the global unique device identification code;
regenerate the random code, when there is a duplicate device identification code in the blockchain network, and combine the regenerated random code with the public key and device information of the at least one IoT device to regenerate the global unique device identification code; and
send the global unique device identification code to the IoT device when there is not a duplicate identification code in the blockchain network.

6. The global unique device identification code distribution device of claim 5, wherein the first processor is further caused to:
receive from the IoT device a global unique device identification code retrieval request, the global unique device identification code retrieval request comprising the public key of the IoT device;
search the blockchain network for the global unique device identification code of the IoT device;
send a retrieval failure message to the IoT device when the IoT device does not have a corresponding device identification code in the blockchain network;
generate a first verification code when the global unique device identification code of the IoT device is found in the blockchain network and encrypt the first verification code with the public key of the IoT device;
send the encrypted first verification code to the IoT device and request the IoT device to send back the first verification code for identity verification;
receive the first verification code from the IoT device and determine whether the first verification code received from the IoT device matches the first verification code sent to the IoT device;
send the global unique device identification code to the IoT device when the first verification code received from the IoT device matches the first verification code sent to the IoT device; and
send the retrieval failure message to the IoT device when the first verification code received from the IoT device does not match the first verification code sent to the IoT device.

7. The global unique device identification code distribution device of claim 6, wherein the first processor is further caused to:
receive a global unique device identification code to be verified from the IoT device and search the blockchain network for the global unique device identification code to be verified;
send a verification failure message to the IoT device when the global unique device identification code to be verified is not found in the blockchain network;
generate a random second verification code when the global unique device identification code to be verified is found in the blockchain network and encrypt the second verification code with the public key of the IoT device found in the blockchain network;
send the encrypted second verification code to the IoT device and request the IoT device to send back the second verification code for identity verification;
receive the second verification code from the IoT device and determine whether the second verification code received from the IoT device matches the second verification code sent to the IoT device;
verify the identity of the IoT device when the second verification code received from the IoT device matches the second verification code sent to the IoT device and send an identity verification success message; and
determine that the IoT device is not verified when the second verification code received from the IoT device does not match the second verification code sent to the IoT device and send an identity verification failure message.

8. The global unique device identification code distribution device of claim 5, wherein:
the global unique device identification code is encrypted according to a predetermined encryption and decryption algorithm; and
the encrypted device identification code is sent to the IoT device.

9. An Internet of things (IoT) device comprising:
a second communication unit adapted to establish communication with a blockchain node of a blockchain network;
a second processor; and
a second memory storing a plurality of instructions, which when executed by the second processor, cause the second processor to:
send a public key and device information of the IoT device after the IoT device establishes communication with the blockchain node;
receive a global unique device identification code from the blockchain node, the global unique device identification code generated by the blockchain node according to the public key and device information of the IoT device;
store the global unique device identification code
generate a code retrieval request in response to an operation command and send the code retrieval request to the blockchain node, the code retrieval request comprising the public key of the IoT device;
receive an encrypted first verification code from the blockchain node, the encrypted first verification code generated with the public key of the IoT device;
decrypting the encrypted first verification code with a private key of the IoT device to obtain the first verification code; and
sending the decrypted first verification code to the blockchain node and receiving the global unique identification code from the blockchain node.

10. The IoT device of claim 9, wherein;
the global unique device identification code is stored in a secure storage area not accessible by an external device and not damageable.

11. The IoT device of claim 9, wherein the second processor is further caused to:
generate the public key and a private key of the IoT device.

* * * * *